(12) United States Patent
Feng

(10) Patent No.: US 10,725,545 B2
(45) Date of Patent: Jul. 28, 2020

(54) TOUCH PANEL WITH TACTILE FORCE FEEDBACK, TACTILE FORCE FEEDBACK SYSTEM THEREOF, AND DISPLAY DEVICE

(71) Applicant: Wuhan China Star Optoelectronics Semiconductor Display Technology Co., Ltd., Wuhan, Hubei (CN)

(72) Inventor: Xiaoliang Feng, Hubei (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 332 days.

(21) Appl. No.: 15/749,470

(22) PCT Filed: Jan. 4, 2018

(86) PCT No.: PCT/CN2018/071405
§ 371 (c)(1),
(2) Date: Jan. 31, 2018

(87) PCT Pub. No.: WO2019/114059
PCT Pub. Date: Jun. 20, 2019

(65) Prior Publication Data
US 2020/0142483 A1    May 7, 2020

(30) Foreign Application Priority Data
Dec. 15, 2017   (CN) .......................... 2017 1 1345601

(51) Int. Cl.
*G06F 3/01*    (2006.01)
*G06F 3/042*   (2006.01)
*G06F 3/043*   (2006.01)

(52) U.S. Cl.
CPC ............ *G06F 3/016* (2013.01); *G06F 3/0421* (2013.01); *G06F 3/0433* (2013.01); *G06F 2203/04106* (2013.01); *G06F 2203/04107* (2013.01)

(58) Field of Classification Search
CPC ...... G06F 3/016; G06F 3/0421; G06F 3/0433; G06F 2203/04106; G06F 2203/04107
See application file for complete search history.

(56) References Cited

U.S. PATENT DOCUMENTS 8,975,567 B2 * 3/2015 Sekizawa .............. G06F 3/0421
                                                250/206.1
10,055,062 B2 * 8/2018 Barel .................... G06F 3/0421

FOREIGN PATENT DOCUMENTS

CN      102880362 A     1/2013
CN      105094464 A    11/2015
(Continued)

*Primary Examiner* — Lisa S Landis
(74) *Attorney, Agent, or Firm* — Hemisphere Law, PLLC; Zhigang Ma

(57) ABSTRACT

A tactile force feedback touch panel is provided, which comprises a plurality of detection components for detecting a touch signal and a protection layer located on a surface of the detection components. Each of the detection components includes a signal transmitting module for transmitting a detection signal and a signal receiving module for receiving the detection signal. The protection layer covers the surface of the detection components and covers a touch region. The signal transmitting module and the signal receiving module are located at at least two adjacent sides of the touch region respectively. A tactile force feedback system is also provided. After the user presses the protection layer, the detection component may detect the condition of deformation of the protection layer according to the detection signal (Continued)

received by the detection component to implement regular touch function and the touch control function with different tactile feeling.

4 Claims, 2 Drawing Sheets

(56) References Cited

FOREIGN PATENT DOCUMENTS

| | | | |
|---|---|---|---|
| CN | 106066737 A | | 11/2016 |
| CN | 106293241 | * | 1/2017 |
| CN | 106293241 A | | 1/2017 |
| CN | 106354304 A | | 1/2017 |
| CN | 106406617 A | | 2/2017 |
| CN | 206039460 U | | 3/2017 |
| WO | WO2017020343 | * | 11/2015 |

* cited by examiner

TOUCH PANEL WITH TACTILE FORCE FEEDBACK, TACTILE FORCE FEEDBACK SYSTEM THEREOF, AND DISPLAY DEVICE

RELATED APPLICATIONS

The present application is a National Phase of International Application Number PCT/CN2018/071405, filed Jan. 4, 2018, and claims the priority of China Application No. 201711345601.6, filed Dec. 15, 2017.

BACKGROUND OF THE INVENTION

1. Field of the Invention

The present invention is related to touch screen technology, and more particularly is related to a touch panel with tactile force feedback, a tactile force feedback system thereof, and a display device.

2. The Related Arts

A touch screen, also known as a touch control screen, a touch panel, is a sensing display device capable to receive the input signals such as touching. When the graphic bottom on the screen is touched, the tactile force feedback system integrated on the screen is capable to drive various connected devices based on a pre-defined program to replace the conventional mechanical push bottom and create a vivid audio and video effect by using the display screen.

The mature touch screen technologies nowadays are the capacitive type touch screen and the resistive type touch screen. The capacitive type touch screen has a transparent conductive ITO layer coated on the surface with an external voltage applied to the four corners, such that a small DC current would be spreading on the surface to generate a uniform electric field. When being touched by the hand, the human body would be an electrode of the coupling capacitor, and the current would be accumulated from the four corners of the screen to compose another electrode of the coupling capacitor. By using a controller to calculate the relative distance the current flowing to the touch position, the coordinates of the touch position can be determined. The resistive type touch screen has a substrate which is covered by the transparent conductive ITO layer for integrating the voltage fields of the X, Y axes. When being touched by the hand, the voltage values for X-axis and the Y-axis of the touch position are detected in time-division scheme to determine to touch position.

However, the aforementioned touch screen technologies can only be used for identifying the touch position. These technologies cannot implement tactile force feedback and thus the touch screen only has single function. Although the function of tactile force feedback can be achieved by placing the pressure sensors at the four corners of the touch screen to detect the touch pressure and have the touch screen generating the corresponding feedback reaction according to the value of the pressure, the layout would be more complicated and is highly relied on the precision of the touch sensors.

SUMMARY

In view of the drawbacks of the conventional technologies, a touch panel with tactile force feedback, which is achieved without the need of a sensor, a tactile force feedback system thereof, and a display device are provided in the present invention.

In order to achieve the aforementioned object, the following technical solution is proposed.

A tactile force feedback touch panel is provided. The tactile force feedback touch panel comprises a plurality of detection components for detecting a touch signal and a protection layer located on a surface of the detection components. Each of the detection components includes a signal transmitting module for transmitting a detection signal and a signal receiving module for receiving the detection signal. The protection layer covers the surface of the detection components and covers a touch region. The signal transmitting module and the signal receiving module are located at the at least two adjacent sides of the touch region respectively.

In accordance with an embodiment of the present invention, the signal transmitting module and the signal receiving module of each of the detection components are disposed as one piece, the detection components are located merely at two adjacent sides of the touch region and spaced apart from each other along an edge of the protection layer.

In accordance with an embodiment of the present invention, the tactile force feedback touch panel further comprises two reflection plates, located beside the touch region and at a side of the touch region opposite to the side with the detection components respectively. The signal transmitting module is an infrared emitter, the signal receiving module is an infrared receiver, and the reflection plates are utilized for reflecting an IR light beam to the infrared receiver.

In accordance with an embodiment of the present invention, the signal transmitting module is an ultrasound transmitter, and the signal receiving module is an ultrasound receiver.

In accordance with an embodiment of the present invention, the tactile force feedback touch panel further comprises a display panel and a packaging layer. The protection layer is transparent. The packaging layer is located around the touch panel to seal the detection components between the display panel and the protection layer.

In accordance with an embodiment of the present invention, a compressible elastic material layer is filled between the display panel and the protection layer, and the elastic material layer is located in a space encircled by the packaging layer.

In accordance with an embodiment of the present invention, the display panel is a liquid crystal display panel, an organic light emitting diode display panel, a plasma display panel, or a light emitting diode display panel.

It is another object of the present invention to provide a tactile force feedback system for the tactile force feedback touch panel. The tactile force feedback system comprises a signal transmitting unit, a signal receiving unit, a processing unit, and a feedback unit.

The signal transmitting unit is utilized for transmitting the detection signal.

The signal receiving unit is utilized for receiving the detection signal.

The processing unit is utilized for generating a decay of the detection signal, which is resulted from shielding of the protection layer, according to the detection signal received by the signal receiving unit.

The feedback unit is utilized for triggering a corresponding touch control action according to the decay of the detection signal.

In accordance with an embodiment of the present invention, the feedback unit includes a grading unit and a trigger unit. The grading unit is utilized for dividing the decay into multiple value ranges corresponding to the different touch control actions one by one, and the trigger unit is utilized for triggering the corresponding touch control action based on the value range in which the decay of the detection signal is situated.

It is another object of the present invention to provide a display device which comprises the tactile force feedback touch panel.

The touch panel of the present invention is provided with tactile force feedback function itself. By setting a protection layer on the detection components, after the user presses the protection layer, the detection component may detect the condition of deformation of the protection layer according to the detection signal received by the detection component such that the touched portion of the touch panel and the deformation of the touched portion can be detected to implement regular touch function. Meanwhile, the pressing force of different levels can be identified and represented by the deformation of the protection layer such that touch control functions of different tactile forces can be achieved.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

DETAILED DESCRIPTION OF THE PREFERRED EMBODIMENTS

In order to understand the above objectives, features and advantages of the present disclosure more clearly, the present disclosure is described in detail below with references to the accompanying drawings and specific embodiments.

The touch panel provided in the present invention has the functions of touch positioning and tactile sensing control, which includes a plurality of detection components for detecting a touch signal and a protection layer located on the surface of the detection components. Each of the detection components includes a signal transmitting module for transmitting a detection signal and a signal receiving module for receiving the detection signal. The protection layer covers the surface of the detection components and covers a touch region.

The signal transmitting module and the signal receiving module are located at the at least two adjacent sides of the touch region respectively. The signals transmitted by each of the signal transmitting modules can be detected by the corresponding signal receiving module. If no touching action is applied, the protection layer does not deform and the signals detected by each of the signal receiving module are kept at a constant value without change; if the protection layer is pressed to form a depression in the pressed region; the depression portion of the protection layer may shield the transmitted signals and the received signals passing through such that the signal received by the corresponding signal receiving module would be changed. Thereby, by analyzing the distribution of the detection signals received by the signal receiving modules at the two perpendicular sides of the touch region; the precise touching position of the touch action can be identified. Meanwhile, by analyzing the decay of the detection signals received by the signal receiving modules though grading the decay, different touch actions can be achieved on the display device based on the grades of the decay to implement different touch functions such that diversity and customization of the touch actions can be implemented.

First Embodiment

Figure 1:
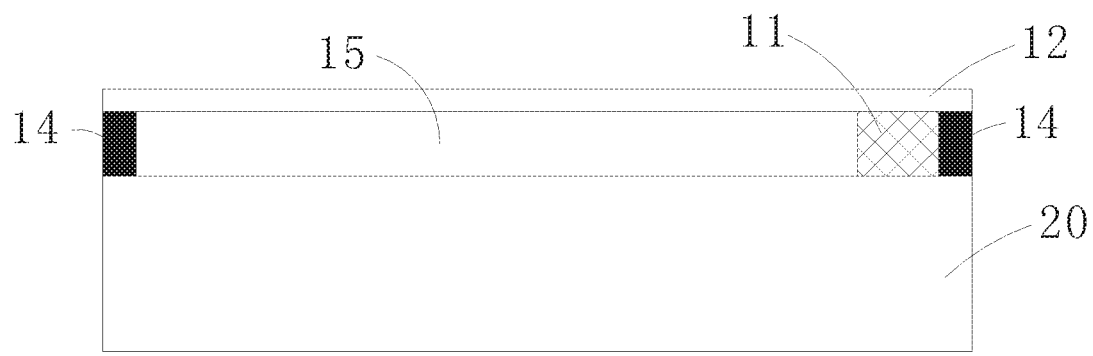
FIG. 1 is a structural schematic view of a tactile force feedback touch panel in accordance with a first embodiment of the present invention.

Please refer to FIG. 1, the tactile force feedback touch panel provided in the present embodiment mainly comprises a plurality of detection components 11 for detecting a touch signal and a protection layer 12 located on the surface of the detection components 11. Each of the detection components 11 includes a signal transmitting module for transmitting a detection signal and a signal receiving module for receiving the detection signal. The protection layer 12 covers the surface of the detection components 11 and covers a touch region. The signal transmitting module and the signal receiving module are located at the at least two adjacent sides of the touch region respectively.

Figure 3:
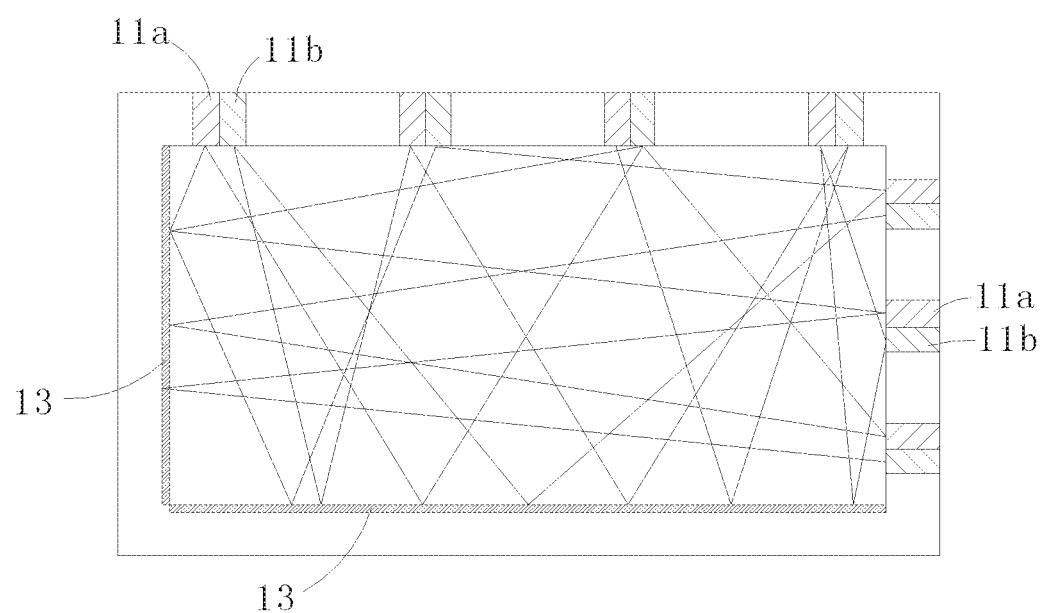
FIG. 3 is a schematic view showing the signal transmission of the tactile force feedback touch panel in accordance with the first embodiment of the present invention.

Please also refer to FIG. 3, the signal transmitting module and the signal receiving module of each of the detection components 11 are disposed as a one-piece element. The detection components 11 are merely located at the two adjacent sides of the touch region. The detection components 11 are spaced apart from each other along the edge of the protection layer 12.

Figure 4:
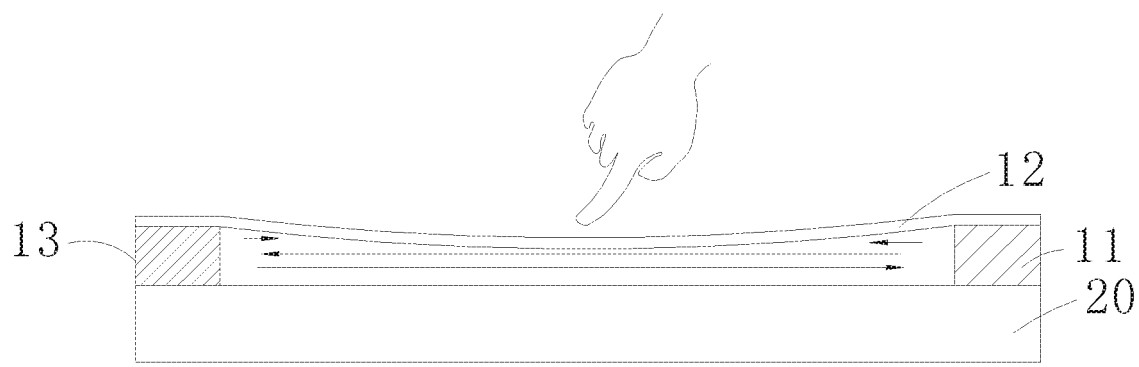
FIG. 4 is a schematic view showing the touch condition of tactile force feedback touch panel in accordance with the first embodiment of the present invention.

In the present embodiment, the detection component 11 is an infrared detection unit. The signal transmitting module 11a is an infrared emitter, the signal receiving module 11b is an infrared receiver. The signal transmitting modules 11a and the signal receiving modules 11b of the detection components 11 are disposed along the length direction of the two adjacent sides of the edges of the touch region, and the other two adjacent sides of the touch region do not have the detection components 11 but have the reflection plates 13 respectively which face the opposite side thereof, i.e. two reflection plates 13 are located at the side of the touch region opposite to the detection components 11. Please also refer to FIG. 4, the infrared detection signal transmitted by the signal transmitting module 11a, after being reflected by the reflection plate 13, is received by the corresponding infrared receiver. If no touching action is applied, the infrared signal received by each of the signal receiving module 11b would be kept at a constant value without change basically; if the protection layer 12 is pressed to form a depression in a specific region, the red light projected to the depression portion would be shielded such that the transmission of some of the reflection signals would be stopped. Thereby, intensity of light received by the corresponding signal receiving module 11b would be changed, and the change can be used to locate the touch portion precisely.

The touch panel provided in the present embodiment may include a display panel 20 integrated therein. For implementing the display function, the protection layer 12 is transparent, and the packaging layer 14 is located around the touch panel to seal the detection components 11 between the display panel 20 and the protection layer 12. In the present embodiment, the region surrounded by the display panel 20, the protection layer 12, the packaging layer 14, and the detection components 11 is a hollow structure. However, in the other embodiments, a compressible elastic material layer 15, which is a transparent material, may be filled in the space encircled by the packaging layer 14 to enhance the elastic recover force of the protection layer 12.

Figure 2:
FIG. 2 is a structural schematic view of another tactile force feedback touch panel in accordance with the first embodiment of the present invention.

As shown in FIG. 2, the detection components 11 of the touch panel and the protection layer 12 may be formed on a base 16. Concretely speaking, the detection components 11 are located between the edge of the protection layer 12 and the base 16, the packaging layer 14 is located between the protection layer 12 and the base 16 to seal the detection components 11 therein. After integrating the detection components 11, the protection layer 12, the base 16 together, the base 16 may be further adhered to the illuminating surface of the display panel 20. The base 16 is made of a transparent material, and the detection components 11 and the packaging layer 14 are located on the non-displaying area of the display panel 20, and thus the image displayed on the display panel would not be affected.

In the present embodiment, the protection layer 12 can be a thinner glass layer, or a flexible thin film made of a wear-resistant material, such as Polyvinyl Chloride (PVC), Polypropylene (PP), or polyethylene terephthalate (PET). The display panel 20 can be a liquid crystal display panel, an organic light emitting diode display panel, a plasma display panel, or a light emitting diode display panel, but the present invention is not limited thereto. The touch panel provided in the present invention should be able to be applied to various types of display devices.

Figure 5:
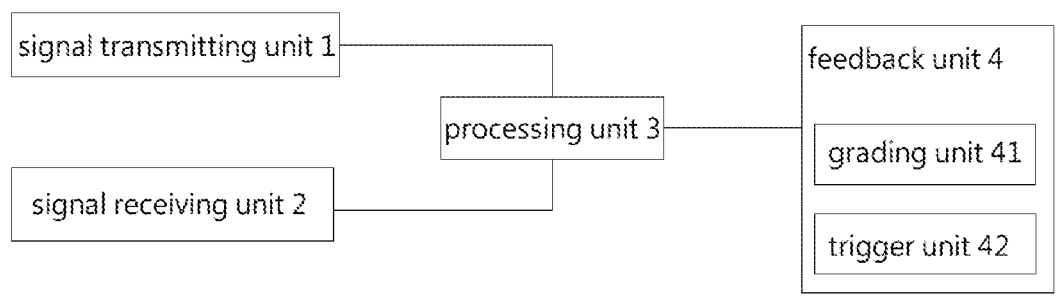
FIG. 5 is a block diagram of a tactile force feedback system in accordance with the first embodiment of the present invention.
Figure 6:
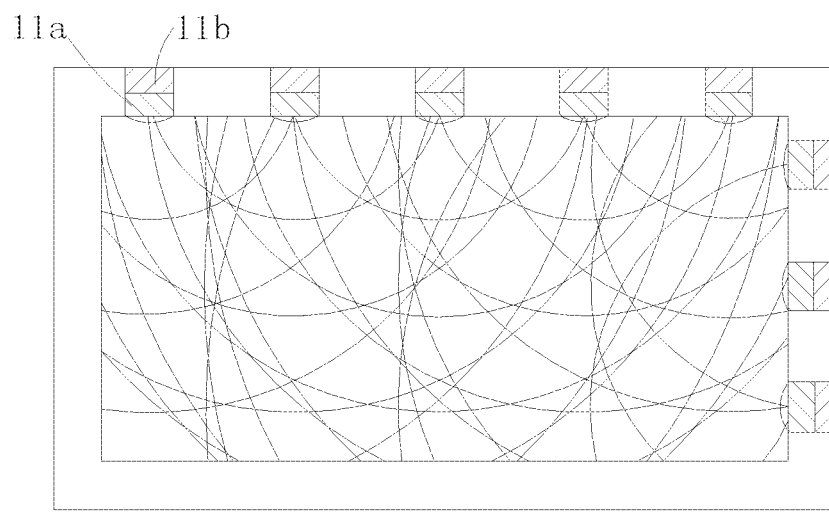
FIG. 6 is a schematic view showing the signal transmission of the tactile force feedback touch panel in accordance with a second embodiment of the present invention.

As shown in FIG. 5, the tactile force feedback system comprises a signal transmitting unit 1, a signal receiving unit 2, a processing unit 3, and a feedback unit 4. The signal transmitting unit 1 is utilized for transmitting the detection signal. The signal receiving unit 2 is utilized for receiving the detection signal. The processing unit 3 is utilized for generating a decay of the detection signal according to the detection signal received by the signal receiving unit 2, which is resulted from the shielding of the protection layer 12. As described above, please also refer to FIG. 4, when the protection layer 12 is pressed to form a depression in a specific region, the detection signal projected to the depression portion would be shielded such that the transmission of some of the detection signals would be stopped. Therefore, the processing unit could simply compare the received detection signal with a preset value such that, once some of the detection signals are blocked by the depression portion, the decay of the detection signal can be calculated therefrom. The feedback unit 4 is utilized for triggering a corresponding touch control action according to the decay of the detection signal. The processing unit 3 is capable to convert the detection signal received by the signal receiving unit 2 into an electric signal. The feedback unit 4 may identify the position of the pressed portion based on the decay of the detection signal, and may also trigger the corresponding touch control actions based on the deformation of the pressed portion of the protection layer 12. For example, as shown in FIG. 3 or FIG. 6, the detection signal is projected from the signal transmitting module 11a, reflected by environments, and received by the signal receiving module 11b (i.e., the signal receiving unit 2). When a region is pressed to form the depression, some of the detection signals are blocked because the transmission paths thereof are blocked by the depression. It can be understood that depression formed at different locations blocks different transmission paths and results in different distribution of detection signals received by some of the signal receiving modules 11b. Therefore, the feedback unit 4 may identify the position of the pressed portion by checking the distribution of the decay of the detection signal generated at each of the signal receiving modules 11b accordingly. Furthermore, as shown in FIG. 3, when the deformation of the pressed region is deeper, the amount of the detection signals blocked by the deformation would be larger such that the decay of the detection signal generated at the same signal receiving module 11b would be greater. Therefore, the deformation of the pressed region can be known by checking the amount of the decay of the detection signal generated at each of the signal receiving modules 11b.

The feedback unit 4 may include a grading unit 41 and a triggering unit 42. The grading unit 41 is utilized for dividing the decay into multiple value ranges corresponding to different touch control actions one by one. Since the feedback unit 4 may identify the deformation and the position of the pressed portion by checking the decay of the detection signal and different touch control actions are performed in accordance with different pressed strengths and positions, the relationship provided by the grading unit 41 can be easily established accordingly. The trigger unit 42 is utilized for triggering the corresponding touch control action based on the value range in which the decay of the detection signal is situated, and thus, grading control of tactile force feedback can be achieved. In one embodiment, the trigger unit 42 can be achieved by realizing the corresponding relationships defined by the grading unit 41. The touch control actions include, but is not limited to, image switching, opening an app (application) process, playing an audio, pause, vibration, and etc.

The touch panel provided in the present invention includes the protection layer 12. The coordinates of the touch operation can be precisely positioned through the deformation of the protection layer 12. Meanwhile, the system may trigger the corresponding touch control action based on the deformation of the protection layer 12. In addition, the protection layer 12 may also have the functions of waterproof and dustproof to prevent the impurities such as dust from entering the touch panel to affect touch control precision and display quality.

Second Embodiment

As shown in FIG. 6, different from the first embodiment, the detection components 11 of the present embodiment is an ultrasound detection unit, the signal transmitting module 11a is an ultrasound transmitter, and the signal receiving module 11b is an ultrasound receiver. The touch panel of the present embodiment does not need to use the reflection plate 13. The elastic material layer 15 of this embodiment can be a sound-wave transmittable transparent material, or an air gap. The depression in the pressed region of the protection layer 12 caused by the finger or some hard objects would shield the transmission of the sound wave, and thus the signal received by the signal receiving module 11b would be weakened. Based on the determination of the decay of the signal received by the signal receiving module 11b, different touch control actions can be implemented by controlling the touch panel.

The touch panel of the present invention is provided with tactile force feedback function itself. By setting a protection layer on the detection components, after the user presses the protection layer, the detection component may detect the condition of deformation of the protection layer according to the detection signal received by the detection component such that the touched portion of the touch panel and the deformation of the touched portion can be detected to implement regular touch function. Meanwhile, the pressing force of different levels can be identified and represented by the deformation of the protection layer such that touch control functions of different tactile forces can be achieved.

What is claimed is:

1. A tactile force feedback system of a tactile force feedback touch panel, wherein the tactile force feedback touch panel comprises a plurality of detection components for detecting a touch signal and a protection layer located on a surface of the detection components, each of the detection components includes a signal transmitting module for transmitting a detection signal and a signal receiving module for receiving the detection signal, the protection layer covers the surface of the detection components and covers a touch region, and the signal transmitting module and the signal receiving module are located at at least two adjacent sides of the touch region respectively, the tactile force feedback system comprising:

a signal transmitting unit, for transmitting the detection signal;
a signal receiving unit, for receiving the detection signal;
a processing unit, for generating a decay of the detection signal, which is resulted from shielding of the protection layer, according to the detection signal received by the signal receiving unit; and
a feedback unit, for triggering a corresponding touch control action according to the decay of the detection signal.

2. The tactile force feedback system of claim 1, wherein the feedback unit includes a grading unit and a trigger unit, the grading unit is utilized for dividing the decay into multiple value ranges corresponding to the different touch control actions one by one, and the trigger unit is utilized for triggering the corresponding touch control action based on the value range in which the decay of the detection signal is situated.

3. The tactile force feedback system of claim 1, wherein the signal transmitting module and the signal receiving module of each of the detection components are disposed as one piece, and the detection components are located merely at two adjacent sides of the touch region and spaced apart from each other along an edge of the protection layer.

4. The tactile force feedback system of claim 3, wherein the tactile force feedback touch panel further comprises two reflection plates, which are located beside the touch region and at a side of the touch region opposite to the side with the detection components respectively, wherein the signal transmitting module is an infrared emitter, the signal receiving module is an infrared receiver, and the reflection plates are utilized for reflecting light emitted by the infrared emitter to the infrared receiver.

\* \* \* \* \*